United States Patent [19]

Browning

[11] Patent Number: 4,764,656

[45] Date of Patent: Aug. 16, 1988

[54] TRANSFERRED-ARC PLASMA APPARATUS AND PROCESS WITH GAS HEATING IN EXCESS OF ANODE HEATING AT THE WORKPIECE

[76] Inventor: James A. Browning, P.O. Box 6, Hanover, N.H. 03755

[21] Appl. No.: 49,910

[22] Filed: May 15, 1987

[51] Int. Cl.[4] .............................................. B23K 9/00
[52] U.S. Cl. ........................... 219/121.44; 219/121.39; 219/121.51; 219/121.52
[58] Field of Search ................. 219/121 PC, 121 PW, 219/121 PH, 121 PP, 121 PQ, 121 PM, 75, 74, 121 PR; 313/231.31, 231.41, 231.51

[56] References Cited

U.S. PATENT DOCUMENTS

| | | | |
|---|---|---|---|
| 2,862,099 | 11/1958 | Gage | 219/121 PP |
| 3,536,885 | 10/1970 | Mitchell | 219/121 PQ |
| 4,125,754 | 11/1978 | Wasserman et al. | 219/121 PP |
| 4,521,666 | 6/1985 | Severance, Jr. et al. | 219/121 PP |
| 4,620,080 | 10/1986 | Arata et al. | 219/121 P |
| 4,639,570 | 1/1987 | Zverina et al. | 219/121 PP |

*Primary Examiner*—M. H. Paschall
*Attorney, Agent, or Firm*—Sughrue, Mion, Zinn, Macpeak & Seas

[57] ABSTRACT

Method and apparatus for increasing the depth of plasma flame cutting of metal via a transferred arc from a transferred-arc plasma cutting torch as created between the cathode electrode coaxial with the plasma torch primary nozzle and the metal workpiece forming the anode electrode and positioned some distance from the exit end of the plasma torch. One or more plasma torch nozzle pieces form additional nozzle lengths and are fixedly mounted to the plasma torch, are formed of metal and are electrically insulated from themselves and the metal plasma torch primary nozzle. The additional nozzles are axially aligned with the primary torch nozzle formed by the metal plasma torch body. Secondary and tertiary plasma gas flows are fed into the primary gas flow at points intermediate of the nozzle pieces tangential into radially enlarged diameter cavities formed by annular electrical insulating pieces which fixedly mount the respective nozzles pieces to each other and one of said nozzle pieces to the plasma torch main metal body forming the primary nozzle. The result is an increase in the arc voltage thereby providing a cutting jet in which gas heating is greater than the anode heating at the workpiece being cut which functions as the anode electrode for the transferred-arc plasma cutting process.

4 Claims, 1 Drawing Sheet

TRANSFERRED-ARC PLASMA APPARATUS AND PROCESS WITH GAS HEATING IN EXCESS OF ANODE HEATING AT THE WORKPIECE

FIELD OF THE INVENTION

The transferred-arc plasma cutting process has become standard for the routine cutting of metals of thickness ranging from sheet metal to about 4 inches. This invention concerns an improvement of the basic process to allow reliable cutting of metals of much much greater thickness.

BACKGROUND OF THE INVENTION

The depth cutting ability of the transferred-arc depends primarily on how far the arc column extends beyond the end of the plasma torch. Looking at it another way, thick sections of metal can only be cut satisfactorily when the arc is made to extend to, or near, the bottom of the cut.

The depth to which the arc column can be made to extend is a function of three variables. There must be sufficient voltage to sustain an elongated arc. There must be sufficient gas velocity to force the arc well down into the kerf being cut. The cutting speed should be adjusted to provide the necessary kerf width allowing the arc column to reach its full depth capability.

The optimization of these three variables rests mainly in operating the equipment at much greater voltage than currently practiced. Such voltage increase is proportioned between that needed to increase the plasma gas enthalpy and that providing sufficient voltage to allow full penetration of the arc column to, or near, the full depth of cut.

A better understanding of the principles governing the invention may be obtained from FIGS. 1 and 2 directed to prior art practice.

A conventional plasma cutting torch 10 is shown in FIG. 1. Torch 10 is comprised of three major components, a hollow cylindrical metal body piece 10 containing an annular gas passage space 15 and a narrow nozzle passage or bore 14a of a nozzle 14. A cathode electrode (usually thoriated tungsten) 12 is properly positioned by an electrical insulating element 11 within one end of the hollow torch body piece 10', with its arcing end 12a adjacent to the entry to nozzle passage 14a. Arc column 13 passes with the plasma gas through and out of nozzle bore 14a to strike workpiece 16 which forms the anode of the circuit. A potential difference is set up between the anode and cathode as shown. Gas jet velocities are extremely high and with the intense arc heating of workpiece 16, a kerf 19 forms from the advancing cut face 17. Molten metal 18 is ejected as shown.

If nozzle bore 14a is too long, or if insufficient gas flow is used, the phenomenon of "double arcing" occurs. The arc, rather than taking the higher voltage path axially through nozzle passage 14a, dips into the conducting metal of body piece 10', passes there-through, and completes the circuit to workpiece 16 as shown by heavy line 20.

"Double arcing" limits the useful nozzle 14 to lengths usually less than ½ inch. The amount of heating realized by the gas passing concurrently with the arc through nozzle passage 14a is a function of the voltage drop of the arc along that path. For a highly swirling flow of nitrogen (vortex flow) entering space 15, tangentially via pipe 22 and through a narrow nozzle passage 23, the voltage gradient can be over 200 volts/inch of arc length. Thus, a nozzle length of ¼ inch provides a 50 volt contribution to the power relationship $V \times A$ where V is voltage and A the current in amperes. $V \times A$ represents the amount of heat passing from the arc into the flowing nitrogen. Assuming a current of 400 amperes, 20 KW of gas heating results.

The level of gas heating determines the exit gas velocity from the nozzle 14. The higher the gas velocity, the greater the penetrating power of the jet 13 to cut through thick metal sections. Also, the arc foot is swept deeper into the kerf 19 allowing thicker sections to be cut. Anode heating of the workpiece 16 contributes approximately 8 KW of heat to the cutting process. Assuming the efficiency of convective heating from the hot gas and plasma to be 20%, the gaseous jet 13 contributes about 5 KW. So long as anode heating is relied upon as the major heating factor, metals of only modest thickness can be cut by the method illustrated in FIG. 1.

FIG. 2 illustrates the problems involved when only inadequate arc voltages are available when cutting a thick metal section. Assuming the same torch 10 and operating conditions as shown in FIG. 1, the arc column 13 extends slightly over halfway through the metal workpiece 25. The top half of the metal workpiece 25 thickness illustrates the appearances of a good kerf 26, as shown by nearly parallel lines. Immediately below, at an abrupt change 27, only a badly melted rough section 28 appears. Shortly beyond line 27 no further cutting is possible. For the conditions used, a practical maximum depth-of-cut is thickness "d".

It is therefore, an object of my invention to provide an improved transferred arc plasma cutting process and apparatus which permits reliable use of arc voltages double, triple, or more than those currently in use, and which greatly reduces, the tendency to "double-arc" and this forms the key to successful cutting of thick metal sections.

BRIEF DESCRIPTION OF THE DRAWINGS

In the drawings, like elements bear like numerical designation.

DESCRIPTION OF PREFERRED EMBODIMENTS

Figure 1:
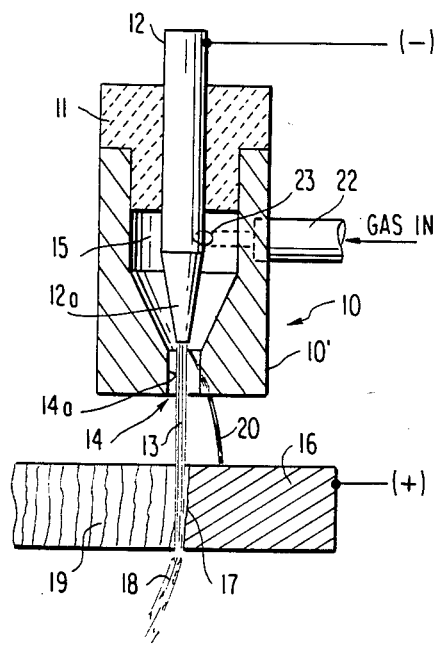
FIG. 1 is a vertical cross-sectional view of a conventional plasma cutting torch.
Figure 3:
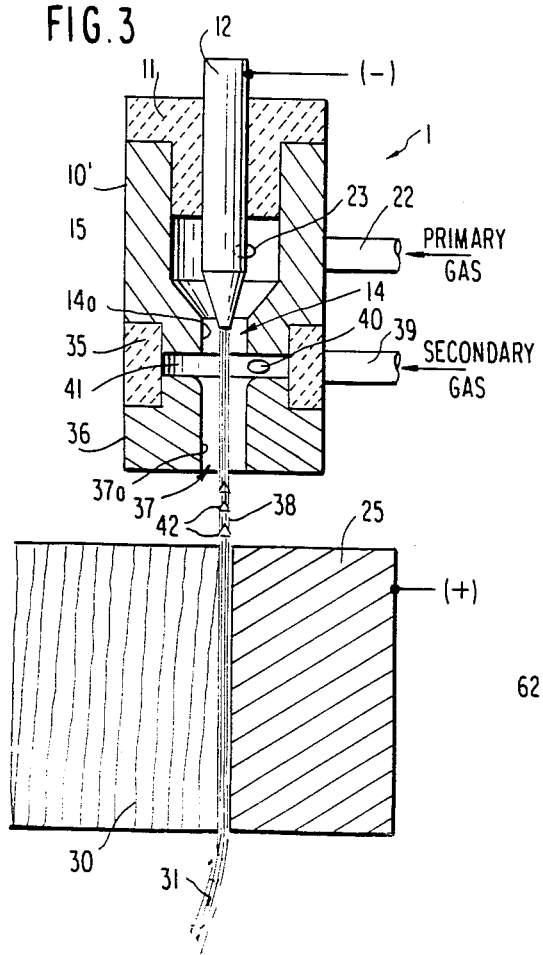
FIG. 3 is a vertical sectional view of an improved, transferred plasma-arc cutting torch forming a preferred embodiment of the invention.

In FIG. 3, a composite transferred arc-plasma torch 1 is shown comprising the torch body piece 10' of FIG. 1 with arc voltage increasing means added. The appended parts to body piece 10' include any annular electrically insulating piece 35 and a second nozzle piece 36. Again, for simplicity, required water cooling means are not shown. Such arc lengthening results from the use of a secondary vortex flow of gas passing into the narrow cylindrical separating zone 41, formed by annular piece 35 through tangential hole 40 from tube 39. Secondary arc passage 37a, of secondary nozzle 37 is a diameter nearly equivalent to primary nozzle passage 14a. There is created, an intense gas vortex with a narrow core section of reduced diameter. The high-velocity plasma gas exiting from torch 10 at nozzle 14 penetrates well down nozzle 37 and is further extended by the secondary gas flow within zone 41. It has been found that the secondary nozzle 37 can be made much longer than the primary nozzle 14. As an example, for a primary nozzle 14 length of ¼ inch, secondary nozzle 37 lengths up to 1 inch are possible without causing "double-arcing". For the case of FIG. 1, the arc voltage drop transferred to KW to the plasma gas. Using a secondary nozzle of 1 inch length increases the total heating of the gas passing through the torch to about 100 KW. As gas exit velocity is a function of mass flow and gas enthalpy, the exit velocity increases by a factor of nearly 4 for the case where the primary and secondary nozzles have bores of the same diameter. The plasma gases of jet 38 are well into the supersonic range as shown by shock-diamonds 42.

Assuming that the process of FIG. 1 is powered by an operating voltage of 160 volts (a representative value in use today) and that the internal voltage drop due to cathode and plasma gas heating are 10 volts and 50 volts, respectively, the voltage available beyond the torch is about 100 volts. In the open atmosphere the voltage gradient of the arc column is about 50 volts per inch. Thus, arc column 13 can be expected to reach through a kerf 30 depth of 2 inches provided that the kerf width is adequately wide to preclude earlier anode action. (The anode heating drop of about 20 volts has not been included in this calculation. Its presence makes the maximum depth of cut somewhat less.)

Using the torch geometry of FIG. 3 with a current of 400 amperes and an operating voltage of 600 volts, the torch 1 voltage drop is 260 volts (10 at the cathode and 250 along the arc column in nozzles 14 and 37.) The voltage remaining available for arc extension into the kerf is 340 volts. At 50 volts per inch, assuming a jet velocity capable of stretching the arc to the bottom of the kerf, a maximum "clean kerf" depth-of-cut of nearly 7 inches results.

The comparisons above are made on a basis of the same current flow of 400 amperes to the respective torches 15 of FIG. 1 and 1 of FIG. 3. The method of the invention operates at a power increase of 3.75 over that of the conventional torch. Maximum available conventional operating voltages are 200 volts. To achieve the equivalent power level of 240 KW (400 amperes at 600 volts of the invention case) a conventional torch 10 would have to operate at a current of 1,200 amperes. Such current levels are extremely difficult to handle. However, when used and compared to the example for FIG. 1, the "clean kerf" depth-of-cut will increase to about 3 inches. Maximum depth-of-cut "d" will be 4 to 5 inches. For FIG. 3, "d" approaches 8 to 9 inches, a significant improvement over the "prior art" of FIG. 1.

Where, for the example of FIG. 1, anode heating of 8 KW outweighs gas heating of 5 KW, a switch in the relative importance of these values results when using the extended arc lengths of the invention. At 400 amperes (assuming a 20 v anode drop) anode heating amounts to 8 KW once again. The gas jet contains 100 KW (400 amperes at a torch arc column voltage drop of 250 volts). A heating efficiency of 20% (heat transferred from the jet to the workpiece) amounts to 20 KW workpiece heating. (In these analyses additional gas heating beyond the torch exit as well as the entrainment of atmospheric air have been ignored.)

Although the examples are described as rough analyses, actual use of the extended-arc method leads to dramatic advances in the cutting of thick metal sections. At a given power level, the reduced current levels lead to increased operating reliability. The increase in depth capability, for a given power level does lead to slower cutting speeds. However, this can only be a disadvantage where conventional equipment performs well, i.e., thinner metal thickness where wider kerf widths can be tolerated.

Figure 4:
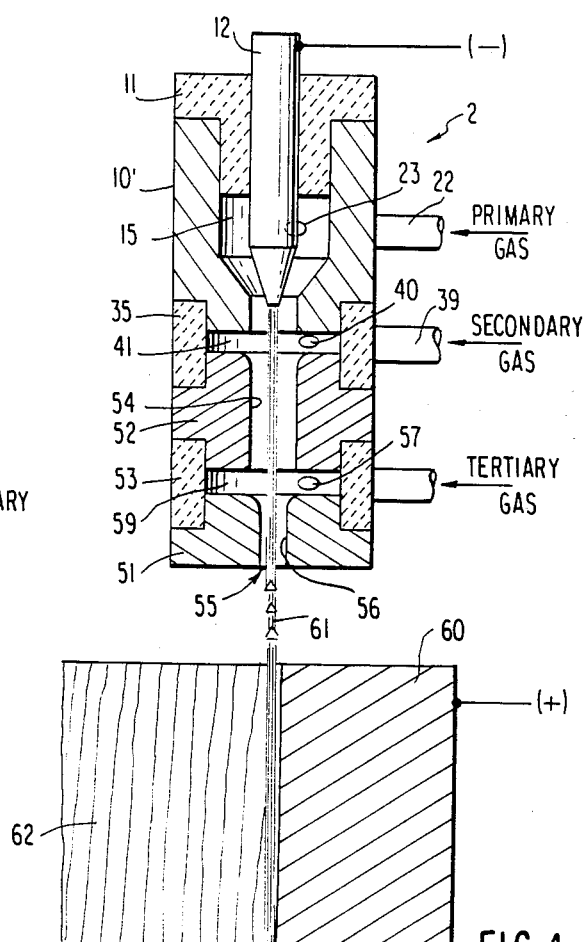
FIG. 4 is a vertical sectional view of a plasma-transferred plasma-arc cutting torch utilizing additional, secondary and tertiary gas nozzle sections in an improved, transferred arc plasma cutting torch forming yet another embodiment of the present invention.

I have found that the secondary nozzle 36, if much longer than 1 inch, can "double-arc" as in the manner shown in FIG. 1 by dark line 20. The use of primary 14 and secondary 37 nozzles, (FIG. 3) is good to about 400 operating volts. For 600 volts, a tertiary nozzle 51 of FIG. 4 is preferred, FIG. 4. In FIG. 4, the bore 54 of secondary nozzle 52 of torch 2 is of a diameter larger than that optimizing cutting action. If allowed to discharge to the atmosphere by removing nozzle 51, the flow jet would be sub-sonic with the arc centered well away from the bore walls by the vortex flow. In the improved transferred arc-plasma torch 2 of FIG. 4, the schematic representation illustrates the use of the primary torch body 50 which may correspond to torch 10 of the FIG. 1 embodiment in which, the cathode electrode 12 is mounted by an electrically insulating cap or end piece 11 to middle body 10 upon a cylindrical form which body 10' of cylindrical form which body 10' includes a nozzle 14 aligned with the tip of the cathode electrode at 12. A passage indicated generally at 23 opens tangentially at 23a to annular space 15 about the cathode electrode 12 with the primary gas forming the initial plasma flow discharging axially from nozzle 14.

An annular electrically insulating piece 35 separates the metal secondary nozzle piece 52 from the metal torch body 10' and forms a radially enlarged cylindrical space of secondary nozzle 54 or chamber 41. Chamber 41 receives a tangential flow of secondary gas via port 40 and which exits with the primary gas plasma flow via the secondary nozzle 37, through the secondary nozzle bore 38. Mounted to the metal secondary nozzle piece 52, is a further tertiary nozzle piece 51 which forms a tertiary nozzle 55 whose bore 56 is of a diameter smaller than secondary nozzle bore 59. A second, annular insulating piece 53 is mounted at opposite ends to the secondary nozzle piece 52 and tertiary nozzle piece 51 to form a chamber 59. In the narrow cylindrical gap which separates the secondary and tertiary nozzle pieces 52, 51, at chamber 59, a whirling flow of tertiary gas is introduced via tangential tertiary gas inlet port 57. With nozzle 55 having a nozzle bore 56 smaller than the nozzle bore 58 of the secondary nozzle 54, the exiting transfer arc gas flow is supersonic.

Figure 2:
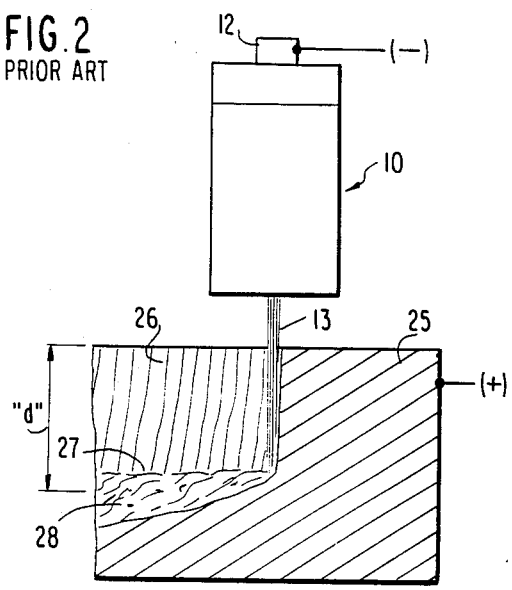
FIG. 2 is a schematic, sectional view of the torch of FIG. 1, attempting to cut a thick section of metal.

In this case, the work piece 60 functions as the anode electrode for the transferred arc torch, and the transferred arc 61 is capable of cutting a metal workpiece 60 whose thickness may be in excess of nine inches, providing a clean kerf 62. In the prior art representation of FIGS. 1 and 2 and in the illustrated embodiments of the invention at FIGS. 3 and 4, the electrical circuit for setting up the transferred-arc plasma jet, of extended length is represented solely by the appropriate cathode and anode connections to the negative and positive sides of an appropriate dc electrical source such as a battery (as a schematic representation only) for the cathode electrode, and anode electrode respectively.

Another embodiment of the invention is the use of the transferred plasma arc to a workpiece in the form of an electrically conducting rod or wire. The wire is rapidly melted, atomized, and sprayed at high velocity to impact against a surface to form a coating on that surface.

While the invention has been illustrated and described in detail in the drawings and foregoing description with respect to preferred embodiments, the same is to be considered as illustrative and not restrictive in character. It should be understood that only the preferred embodiments have been shown and described and that all changes and modifications that come within the spirit of the invention desire to be protected.

What is claimed is:

1. In a transferred-arc plasma metal cutting process comprising the step of setting up a transferred arc column between a cathode electrode aligned with a primary plasma gas discharge nozzle of a transferred-arc plasma torch body and an underlying metal workpiece to be cut with a primary gas flow exiting through said primary gas discharge nozzle, the improvement comprising the step of adding at least one additional nozzle length to said torch, discharging a secondary gas flow at high velocity through said at least one additional nozzle length, said nozzle length being axially aligned with the primary nozzle and positioned downstream thereof, applying a sufficiently high voltage between said transferred-arc plasma torch body and said underlying metal workpiece to produce a transferred-arc operating at a sufficiently high amperage, with the combined nozzle length having L/D ratios in the neighborhood of 8, wherein L is the nozzle length and D is the nozzle diameter, such that a level of gas heated within the torch body creates an exit gas velocity which is supersonic, resulting in an extended transferred-arc capable of cutting a good kerf completed through thick metal workpieces reducing the tendency to double arc through the at least one secondary nozzle, and wherein the gas heating is in excess of the anode heating at the workpiece being cut.

2. The transferred-arc plasma metal cutting process as claimed in claim 1 wherein said at least one additional nozzle length comprises first and second axially spaced additional nozzle lengths, said nozzle lengths being separated from each other and in order with the first additional nozzle length being separated from said primary plasma gas discharge nozzle by an annular electrically insulating piece having an internal diameter larger than the bore diameters of said additional nozzle lengths and said second additional nozzle length having a bore diameter less than that of said primary gas discharge nozzle, and said two additional nozzle lengths being separated by a like annular electrically insulating piece and wherein said method comprises feeding said secondary gas tangentially into the interior of the annular electrically insulating pieces to set up a vortex flow of the secondary gas within the interior of the annular electrically insulating piece prior to said secondary gas exiting from said additional nozzle lengths with the overall gas exit velocity being a function of mass flow and gas enthalpy.

3. In a transferred-arc plasma metal cutting torch comprising a hollow metal cylindrical torch body, one end of said cylindrical torch body being closed off by an insulating piece, a cathode electrode mounted to said cylindrical torch body within said insulating piece and extending axially within said hollow cylindrical torch body and being radially spaced therefrom to form an annular plasma gas chamber, said hollow metal cylindrical torch body having an end wall opposite said insulating piece including an axial bore forming a plasma torch primary nozzle, means for introducing a primary plasma forming gas into the interior of the cylindrical metal torch body for passage through said primary nozzle, the improvement comprising; at least one additional nozzle length mounted to said cylindrical torch body coaxial with said primary nozzle and extending downstream thereof, means for feeding a secondary gas flow under pressure through said at least one additional nozzle length, a metal workpiece underlies said at least one nozzle length, being axially spaced therefrom and forming an anode electrode and means for creating an electrical potential difference between said cathode electrode and said anode electrode, at high voltage and under high current conditions such that a high arc voltage results setting up a plasma gas metal cutting jet in which gas heating within the torch body is greater than anode heating at the workpiece being cut by said plasma gas metal cutting jet and wherein said at least one nozzle length comprises a metal secondary nozzle piece of annular form, having an axial nozzle bore aligned with the axial bore within said end wall of said metal cylindrical torch body, wherein an annular electrically insulating piece is interposed between said metal cylindrical torch body and said metal secondary nozzle piece, wherein the annular electrically insulating piece has an inner diameter which is in excess of the nozzle bore diameter for said metal cylindrical torch body and said secondary nozzle piece, and wherein a passage is formed within said annular electrically insulating piece connected to said secondary gas which opens tangentially into the interior thereof such that a vortex flow of secondary gas is formed within the interior of said annular electrically insulating piece prior to discharge through said at least one secondary nozzle piece, wherein said at least one secondary nozzle comprises a pair of nozzle pieces separated by a coaxial annular electrically insulated piece having an inner diameter in excess of the bore diameters of said nozzle pieces, and wherein the bore diameter of the nozzle piece proximate to said primary nozzle is larger than the diameter of the primary nozzle and that of the nozzle piece remote from the primary nozzle, and wherein the diameter of the nozzle piece remote from the primary nozzle is smaller than that of the primary nozzle, and wherein at least said nozzle of said nozzle piece remote from said primary nozzle has a high L/D ratio, where L is the nozzle length and D is the nozzle diameter, such that a plasma jet exit from the nozzle piece remote from said primary nozzle is at supersonic velocity, and wherein the elongated arc created thereby is at a sufficiently high voltage to sustain the arc and the supersonic gas velocity forces the arc well down into the kerf being cut into the workpiece under conditions of significantly increased plasma gas enthalpy.

4. In a transferred-arc plasma process comprising the step of setting up a transferred arc column between a cathode electrode aligned with a primary plasma gas discharge nozzle of a transferred-arc plasma torch body and a metal workpiece spaced therefrom, the improvement comprising the steps of; adding at least one additional nozzle length to said torch body and discharging a secondary gas flow at high velocity through said at least one additional nozzle length, said nozzle length being axially aligned with the primary nozzle and positioned downstream thereof, increasing the arc voltage between the cathode electrode and the workpiece and maintaining a sufficiently high current across the resulting arc to significantly increase the plasma gas enthalpy, and wherein the L/D ratio of the primary plasma gas discharge nozzle and said at least one additional nozzle length is sufficiently high such that a plasma jet discharges from the at least one additional nozzle length at supersonic velocity, wherein L is the nozzle length and D is the nozzle diameter, whereby the plasma gas heating within the plasma torch body is in excess of the anode heating at the metal workpiece to effect full penetration of the arc column to or near the depth of cut, thereby maximizing the depth of cut within the metal workpiece without "double-arcing".

* * * * *